US011444854B2

(12) United States Patent
Moore et al.

(10) Patent No.: US 11,444,854 B2
(45) Date of Patent: *Sep. 13, 2022

(54) SYSTEM TO COLLECT AND VISUALIZE SOFTWARE USAGE METRICS

(71) Applicant: Palantir Technologies Inc., Palo Alto, CA (US)

(72) Inventors: Cody Moore, Menlo Park, CA (US); Yiwei Gao, Palo Alto, CA (US); Andrew Colombi, San Francisco, CA (US); David Karesh, Palo Alto, CA (US); William Ward, New York City, NY (US); Alexander Ince-Cushman, San Francisco, CA (US); Mohammad Bukhari, Palo Alto, CA (US); Daniel Kozlowski, Palo Alto, CA (US); Jason Richardson, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/730,561

(22) Filed: Dec. 30, 2019

(65) Prior Publication Data

US 2020/0204466 A1 Jun. 25, 2020

Related U.S. Application Data

(63) Continuation of application No. 15/178,387, filed on Jun. 9, 2016, now Pat. No. 10,554,516.

(51) Int. Cl.
*H04L 43/045* (2022.01)
*H04L 67/01* (2022.01)
*H04N 1/00* (2006.01)

(52) U.S. Cl.
CPC ............ *H04L 43/045* (2013.01); *H04L 67/01* (2022.05); *H04N 1/00506* (2013.01)

(58) Field of Classification Search
None
See application file for complete search history.

(56) References Cited

U.S. PATENT DOCUMENTS 5,418,950 A 5/1995 Li et al.
5,428,737 A 6/1995 Li et al.
(Continued)

FOREIGN PATENT DOCUMENTS

DE 102014103482 A1 9/2014
EP 1647908 A2 4/2006
(Continued)

OTHER PUBLICATIONS

"A Quick Guide to UniProtKB Swiss-Prot & TrEMBL", UniProt Consortium, Ongoing and future developments at the Universal Protein Resource, (Sep. 2011), 1-2.
(Continued)

*Primary Examiner* — Uzma Alam
(74) *Attorney, Agent, or Firm* — Schwegman Lundberg & Woessner, P.A.

(57) ABSTRACT

Example embodiments involve a metrics collection system for collecting software usage metrics from one or more client devices at deployments. A computer, such as a server configured to execute the metrics collection system, collects software usage metrics (e.g., as a metrics submission from a client device) of the software product at the deployment, identifies a metrics type of the software usage metrics collected, assigns the software usage metrics to a metrics category, and calculates and updates a metrics score of the metrics category, based on the software usage metrics collected.

20 Claims, 14 Drawing Sheets

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Zbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bigham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez, Jr. et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger |
| 8,073,857 B2 | 12/2011 | Sreekanth |
| 8,103,962 B2 | 1/2012 | Embley et al. |
| 8,417,715 B1 | 4/2013 | Bruckhaus |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing et al. |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,317,395 B2* | 4/2016 | Wood .................. G06F 11/3495 |
| 9,330,120 B2 | 5/2016 | Downing et al. |
| 9,348,677 B2 | 5/2016 | Marinelli |
| 9,378,526 B2 | 6/2016 | Sampson |
| 10,554,516 B1 | 2/2020 | Moore et al. |
| 2002/0091811 A1* | 7/2002 | Schweitzer ........... G06F 16/258 709/223 |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels et al. |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0168107 A1* | 7/2006 | Balan .................. G06F 9/505 709/218 |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2009/0006150 A1 | 1/2009 | Prigge et al. |
| 2009/0007056 A1 | 1/2009 | Prigge et al. |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaithesswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0115091 A1 | 5/2010 | Park et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0269087 A1* | 10/2010 | Kabra .................. G06F 8/71 717/101 |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |

(56) References Cited

U.S. PATENT DOCUMENTS

| | | |
|---|---|---|
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0124669 A1* | 5/2013 | Anderson ............ H04L 43/0876 709/217 |
| 2013/0124720 A1* | 5/2013 | Wood ................... G06F 11/3495 709/224 |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0011561 A1 | 4/2014 | Marinelli, III et al. |
| 2014/0108074 A1 | 4/2014 | Miller et al. |
| 2014/0115589 A1 | 4/2014 | Marinelli, III et al. |
| 2014/0214579 A1 | 7/2014 | Shen et al. |
| 2014/0244388 A1 | 8/2014 | Manouchehri et al. |
| 2014/0379934 A1* | 12/2014 | Brooks ............... H04L 43/0888 709/228 |
| 2015/0112641 A1 | 4/2015 | Faraj |
| 2015/0269030 A1 | 9/2015 | Fisher et al. |
| 2016/0026923 A1 | 1/2016 | Erenrich et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| GB | 2366498 A | 3/2002 |
| GB | 2508503 B | 1/2015 |
| GB | 2508293 B | 4/2015 |
| HK | 1194178 B | 9/2015 |
| NZ | 622485 A | 3/2015 |
| NZ | 616212 A | 5/2015 |
| NZ | 616299 A | 7/2015 |
| WO | WO-0034895 A1 | 6/2000 |
| WO | WO-2010030917 A2 | 3/2010 |
| WO | WO-2013030595 A1 | 3/2013 |

OTHER PUBLICATIONS

"A Tour of Pinboard", [Online] Retrieved from the internet: <https://pinboard.in/tour/>, (May 15, 2014), 1-6.

"U.S. Appl. No. 13/411,291, Examiner Interview Summary dated Oct. 1, 2015", 3 pgs.

"U.S. Appl. No. 13/411,291, Non Final Office Action dated Jul. 15, 2015", 39 pgs.

"U.S. Appl. No. 13/411,291, Notice of Allowance dated Apr. 22, 2016", 27 pgs.

"U.S. Appl. No. 13/608,864, Final Office Action dated Jun. 8, 2015", 23 pgs.

"U.S. Appl. No. 13/608,864, First Action Interview Pre-Interview Communication dated Mar. 17, 2015", 16 pgs.

"U.S. Appl. No. 13/657,635, Final Office Action dated Oct. 7, 2015", 43 pgs.

"U.S. Appl. No. 13/657,635, Non Final Office Action dated Mar. 30, 2015", 20 pgs.

"U.S. Appl. No. 13/657,635, Notice of Allowance dated Jan. 29, 2016", 10 pgs.

"U.S. Appl. No. 13/657,656, Final Office Action dated May 6, 2015", 29 pgs.

"U.S. Appl. No. 13/657,656, Non Final Office Action dated Oct. 7, 2014", 16 pgs.

"U.S. Appl. No. 13/657,656, Notice of Allowance dated May 10, 2016", 27 pgs.

"U.S. Appl. No. 13/767,779, Notice of Allowance dated Mar. 17, 2015", 28 pgs.

"U.S. Appl. No. 13/827,627, Examiner Interview Summary dated Oct. 20, 2015", 3 pgs.

"U.S. Appl. No. 13/827,627, Final Office Action dated Aug. 26, 2015", 21 pgs.

"U.S. Appl. No. 13/827,627, Non Final Office Action dated Mar. 2, 2015", 27 pgs.

"U.S. Appl. No. 13/827,627, Non Final Office Action dated Dec. 22, 2015", 12 pgs.

"U.S. Appl. No. 13/827,627, Notice of Allowance dated Apr. 11, 2016", 5 pgs.

"U.S. Appl. No. 13/831,791, Final Office Action dated Aug. 6, 2015", 19 pgs.

"U.S. Appl. No. 13/831,791, Non Final Office Action dated Mar. 4, 2015", 20 pgs.

"U.S. Appl. No. 14/019,534, Examiner Interview Summary dated Sep. 4, 2015", 5 pgs.

"U.S. Appl. No. 14/019,534, First Action Interview Pre-Interview Communication dated Jul. 20, 2015", 4 pgs.

"U.S. Appl. No. 14/019,534, Notice of Allowance dated Feb. 4, 2016", 20 pgs.

"U.S. Appl. No. 14/025,653, First Action Interview Pre-Interview Communication dated Mar. 3, 2016", 9 pgs.

"U.S. Appl. No. 14/025,653, First Action Interview Pre-Interview Communication dated Oct. 6, 2015", 13 pgs.

"U.S. Appl. No. 14/134,558, Final Office Action dated May 16, 2016", 30 pgs.

"U.S. Appl. No. 14/134,558, Non Final Office Action dated Oct. 7, 2015", 9 pgs.

"U.S. Appl. No. 14/134,558, Office Action dated Aug. 26, 2016", 3 pgs.

"U.S. Appl. No. 14/254,757, Notice of Allowance dated Sep. 10, 2014", 30 pgs.

"U.S. Appl. No. 14/254,773, Notice of Allowance dated Aug. 20, 2014", 23 pgs.

"U.S. Appl. No. 14/304,741, Final Office Action dated Mar. 3, 2015", 24 pgs.

"U.S. Appl. No. 14/304,741, Notice of Allowance dated Apr. 7, 2015", 22 pgs.

"U.S. Appl. No. 14/304,741, Pre-Interview Communication dated Aug. 6, 2014", 13 pgs.

"U.S. Appl. No. 14/581,902, Notice of Allowance dated Nov. 13, 2015", 16 pgs.

"U.S. Appl. No. 14/877,229, Non Final Office Action dated Mar. 22, 2016", 46 pgs.

"U.S. Appl. No. 15/066,970, Notice of Allowance dated Jun. 29, 2016", 13 pgs.

"U.S. Appl. No. 15/178,387, Examiner Interview Summary dated Jun. 27, 2019", 3 pgs.

"U.S. Appl. No. 15/178,387, Final Office Action dated Jan. 22, 2019", 8 pgs.

"U.S. Appl. No. 15/178,387, First Action Interview—Office Action Summary dated Jul. 24, 2018", 6 pgs.

"U.S. Appl. No. 15/178,387, First Action Interview—Pre-Interview Communication dated Feb. 21, 2018", 3 pgs.

"U.S. Appl. No. 15/178,387, Non Final Office Action dated May 15, 2019", 8 pgs.

"U.S. Appl. No. 15/178,387, Notice of Allowance dated Oct. 2, 2019", 5 pgs.

"U.S. Appl. No. 15/178,387, Response filed Mar. 27, 2019 to Final Office Action dated Jan. 22, 2019", 12 pgs.

"U.S. Appl. No. 15/178,387, Response filed Jul. 3, 2019 to Non-Final Office Action dated May 15, 2019", 14 pgs.

"U.S. Appl. No. 15/178,387, Response filed Sep. 21, 2018 to First Action Interview—Office Action Summary dated Jul. 24, 2018", 15 pgs.

"Australian Application Serial No. 2013237710, Office Action dated Jan. 16, 2015", 3 pgs.

"Australian Application Serial No. 201337658, Office Action dated Feb. 2, 2015", 5 pgs.

"Australian Application Serial No. 2014201580, Office Action dated Feb. 27, 2015", 2 pgs.

"Canadian Application Serial No. 2,807,899, Office Action dated Jul. 20, 2015", 3 pgs.

(56) References Cited

OTHER PUBLICATIONS

"Canadian Application Serial No. 2,807,899, Office Action dated Oct. 24, 2014", 4 pgs.
"Canadian Application Serial No. 2,807,899, Office Action dated Jun. 14, 2016", 4 pgs.
"Canadian Application Serial No. 2,828,264, Office Action dated Apr. 11, 2016", 4 pgs.
"Canadian Application Serial No. 2,828,264, Office Action dated Apr. 28, 2015", 4 pgs.
"Canadian Application Serial No. 2,829,266, Office Action dated Apr. 1, 2016", 4 pgs.
"Canadian Application Serial No. 2,829,266, Office Action dated Apr. 28, 2015", 3 pgs.
"Chapter 2: IBM InfoSphere DataStage stages", IBM Corp; Modification 0 of IBM Information Server, Version 8, Release 1, 1st Edition, (2008), 35-137.
"Countly", Countly Mobile Analytics, [Online]. Retrieved from the Internet: <URL: http://count.ly/products/screenshots, (accessed Jul. 18, 2013), 9 pgs.
"Delicious", [Online]. Retrieved from the Internet: <URL: http://delicious.com/>, (accessed May 15, 2014), 1 pg.
"European Application Serial No. 13157474.1, Office Action dated Oct. 30, 2015", 5 pgs.
"European Application Serial No. 13157474.1, Summons to oral proceedings mailed Apr. 29, 2016", 6 pgs.
"European Application Serial No. 14159175.0, Office Action dated Feb. 4, 2016", 5 pgs.
"European Application Serial No. 14159175.0, Office Action dated Jul. 17, 2014", 10 pgs.
"European Application Serial No. 14159464.8, Non Final Office Action dated Feb. 18, 2016", 6 pgs.
"European Application Serial No. 14159629.6, Extended European Search Report dated Jul. 31, 2014", 7 pgs.
"European Application Serial No. 14159629.6, Office Action dated Sep. 22, 2014", 2 pgs.
"European Application Serial No. 15159520.4, Extended European Search Report dated Jul. 15, 2015", 9 pgs.
"Frequently Asked Questions about Office Binder 97", [Online]. Retrieved from the Internet: <URL: http://web.archive.org/web/20100210112922/http://support.microsoft.com/kb/843147>, (Accessed Dec. 18, 2006), 5 pgs.
"German Application Serial No. 102013221052.3, Office Action dated Mar. 24, 2015", w/English Translation, 17 pgs.
"German Application Serial No. 102013221057.4, Office Action dated Mar. 23, 2015", w/English Translation, 17 pgs.
"Google Analytics Official Website—Web Analytics & Reporting", [Online], Retrieved from the Internet: <URL: http://www.google.com/ analytics/index.html, (accessed Jul. 18, 2013), 22 pgs.
"Great Britain Application Serial No. 1404574.4, Office Action dated Dec. 18, 2014", 2 pgs.
"Java Remote Method Invocation: 7—Remote Object Activation", [Online]. Retrieved from the Internet: <URL: https://docs.oracle.com/javase/7/docs/platform/rmi/spec/rmi-activation2.html, (accessed Dec. 31, 2010), 2 pgs.
"Machine Code", Wikipedia, [Online]. Retrieved from the Internet: <URL: http://en.wikipedia.org/wiki/Machine code>, (Accessed Aug. 11, 2014), 1-5.
"Mixpanel: Actions speak louder than page views", Mobile Analytics, [Online]. Retrieved from the Internet: <URL: https://mixpanel.com/>, (Accessed: Jul. 18, 2013), 13 pgs.
"Netherlands Application Serial No. 2011613, Netherlands Search Report dated Aug. 13, 2015", W/ English Translation, 7 pgs.
"Netherlands Application Serial No. 2011627, Netherlands Search Report dated Aug. 14, 2015", W/ English Translation, 9 pgs.
"Netherlands Application Serial No. 2012437, Netherlands Search Report dated Sep. 18, 2015", W/ English Translation, 7 pgs.
"New Zealand Application Serial No. 616212, Notice of Allowance dated Jan. 23, 2015", 1 pg.
"New Zealand Application Serial No. 616299, Notice of Allowance dated Apr. 7, 2015", 1 pg.

"New Zealand Application Serial No. 616299, Office Action dated Jan. 26, 2015", 2 pgs.
"New Zealand Application Serial No. 622414, Office Action dated Mar. 24, 2014", 2 pgs.
"New Zealand Application Serial No. 622484, Office Action dated Apr. 2, 2014", 2 pgs.
"New Zealand Application Serial No. 622485, Notice of Allowance dated Nov. 24, 2014", 1 pg.
"New Zealand Application Serial No. 622485, Office Action dated Nov. 21, 2014", 1 pg.
"Piwik—Free Web Analytics Software", Piwik, [Online]. Retrieved from the Internet: <URL: http://piwik.org/>, (Accessed: Jul. 19, 2013), 18 pgs.
"The FASTA Program Package", fasta-36.3.4, (Mar. 25, 2011), 1-29.
Bae, Jinuk et al., "Partitioning Algorithms for the Computation of Average Iceberg Queries", DaWaK 2000, LNCS 1874, (2000), 276-286.
Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross-Domain Call Overhead Using Batched Futures", SIGPLAN No. 29, 10, OOPSLA ' 94, (Oct. 1994), 341-354.
Bogle, Phillip, "Reducing Cross-Domain Call Overhead Using Batched Futures", Massachusetts Institute of Technology (Submitted to the Dept. of Electrical Engineering and Computer Science in partial fulfillment of the requirement for the degree of Master of Science in Computer Science and Engineering), (1994), 1-96.
Bouajjani, Ahmed, et al., "Analysis of Recursively Parallel Programs", POPL'12, (Jan. 2012), 203-214.
Canese, Kathi, et al., "Chapter 2: PubMed: The Bibliographic Database", The NCBI Handbook, (Oct. 2002), 1-10.
Chazelle, Bernard, et al., "The Bloomier Filter: An Efficient Data Structure for Static Support Lookup Tables", SODA '04 Proceedings of the Fifteenth Annual ACMSIAM Symposium on Discrete Algorithms, (2004), 30-39.
Delcher, Arthur, et al., "Identifying Bacterial Genes and Endosymbiont DNA with Glimmer", BioInformatics, vol. 23, No. 6, (2007), 673-679.
Donjerkovic, Donko, et al., "Probabilistic Optimization of Top N Queries", Proceedings of the 25th VLDB Conference, (1999), 411-422.
Fang, Min, et al., "Computing Iceberg Queries Efficiently", Proceedings of the 24th VLDB Conference, (1998), 299-310.
Goldstein, Seth Copen, et al., "Stacks Lazy Threads: Implementing a Fast Parallel Call", Journal of Parallel and Distributed Computing, (Jan. 1996), 5-20.
Han, Jiawei, et al., "Efficient Computation of Iceberg Cubes with Complex Measures", ACM Sigmod, (May 21-24, 2001), 1-12.
Ivanova, Milena, et al., "An Architecture for Recycling Intermediates in a Column-store", Proceedings of the 35th Sigmod International Conference on Management of Data, SIGMOD '09, (Jun. 29, 2009), 309-320.
Jacques, Mathieu, "An Extensible Math Expression Parser with Plug-ins", Code Project, [Online]. Retrieved from the Internet: <URL: http://www.codeproject.com/Articles/7335/An-extensible-math-expression-parser-with-plug-ins>, (Mar. 13, 2008), 1-34.
Jenks, Stephen, et al., "Nomadic Threads: A Migrating Multithreaded Approach to Remote Memory Accesses in Multiprocessors", Parallel Architectures and Compilation Techniques, (Oct. 1996), 2-11.
Kahan, J., et al., "Annotea: an open RDF Infrastructure for Shared Web Annotations", Computer Networks vol. 39, No. 5, Elsevier Science Publishers B.V., Amsterdam, NL, (2002), 589-608.
Karp, Richard, et al., "A Simple Algorithm for Finding Frequent elements in Streams and Bags", ACM Transactions on Database Systems, vol. 28, No. 1, (Mar. 2003), 51-55.
Kitts, Paul, "Chapter 14: Genome Assembly and Annotation Process", The NCBI Handbook, (Oct. 2002), 1-21.

(56) References Cited

OTHER PUBLICATIONS

Leela, Krishna P, et al., "On Incorporating Iceberg Queries In Query Processors", Lecture Notes in Computer Science: Database Systems for Advanced Applications, vol. 2973, Springer Berlin Heidelberg, (2004), 431-442.

Liu, Hongyan, et al., "Methods for Mining Frequent Items in Data Streams: An Overview", Knowledge and Information Systems, vol. 26, No. 1, (Jan. 2011), 1-30.

Madden, "Chapter 16: BLAST Sequence Analysis Tool", The NCBI Handbook, (Oct. 2002), 1-15.

Mendes, Pablo, et al., "TcruziKB: Enabling Complex Queries for Genomic Data Exploration", IEEE International Conference on Semantic Computing, (Aug. 2008), 432-439.

Mizrachi, Ilene, "Chapter 1: GenBank: The Nucleotide Sequence Database", The NCBI Handbook, (Oct. 2002), 1-14.

Plasil, Frantisek, "An Architectural View of Distributed Objects and Components in CORBA, Java RMI and COM/DCOM", Software—Concepts & Tools, vol. 19, No. 1, (Jun. 1998), 14-28.

Russell, Alastair, et al., "NITELIGHT: A Graphical Tool for Semantic Query Construction", University of Southhampton, UK, (2008), 1-10.

Sigrist, Christian, et al. "PROSITE, a Protein Domain Database for Functional Characterization and Annotation", Nucleic Acids Research, vol. 38, (2010), D161-D166.

Sirotkin, Karl, et al., "Chapter 13: The Processing of Biological Sequence Data at NCBI", The NCBI Handbook, (Oct. 2002), 1-11.

Smart, Paul, et al., "A Visual Approach to Semantic Query Design Using a Web-Based Graphical Query Designer", 16th International Conference on Knowledge Engineering and Knowledge Management (EKAW), (2008), 16 pgs.

Stamos, James, et al., "Remote Evaluation", ACM Transactions on Programming Languages and Systems, vol. 12, No. 4, (Oct. 1990), 537-565.

Wollrath, Ann, et al., "A Distributed Object Model for the Java System", Proceedings of the 2nd Conference on USENEX, Conference on Object-Orients Technologies and Systems, (Jun. 1996), 219-231.

\* cited by examiner

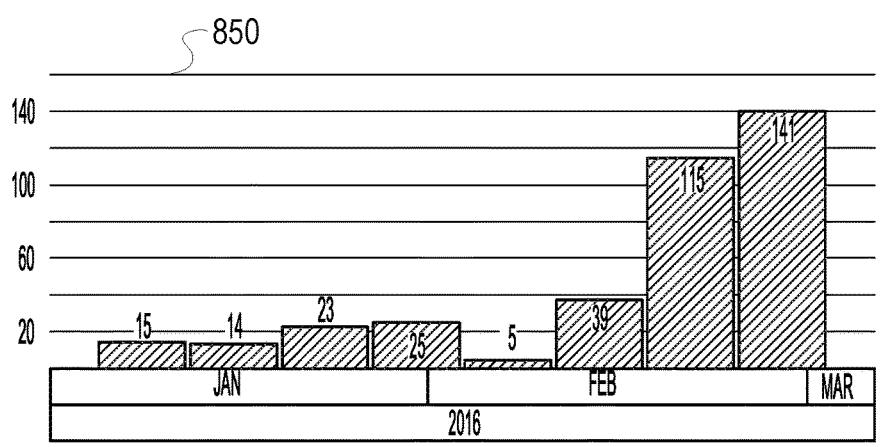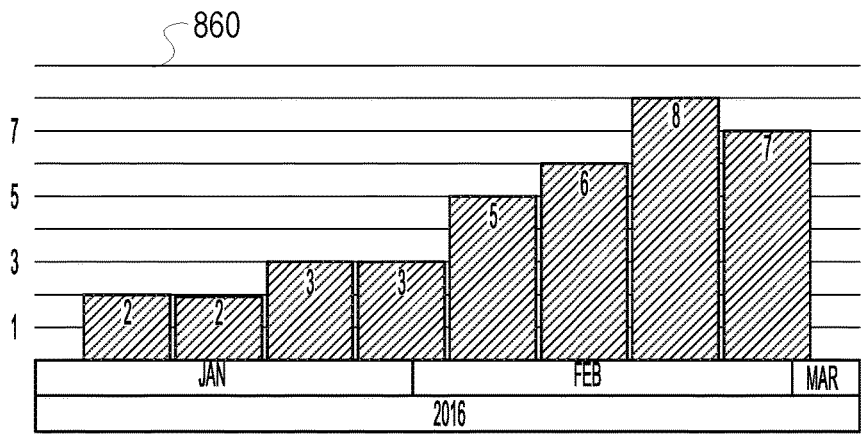
FIG. 8

1300

HOME

MANUAL PRODUCT METRIC SUBMISSION FORM

INPUT BELOW: Select your deployment and the date of report (first day of the week for which you are reporting unique logins) and then input the values. Verify your entries were submitted via table below.

SELECT DEPLOYMENT: —1310

DATE OF REPORT: —1320

WHEN?

SW VERSION: e.g. 3.13.3.1 —1330

UNIQUE WEEKLY LOGINGS: e.g. 74 —1340

SUBMIT | Submission result... —1350

HISTORICAL DATA —1360

| published_time | generation_time | metric | value |
|---|---|---|---|

*FIG. 13*

SYSTEM TO COLLECT AND VISUALIZE SOFTWARE USAGE METRICS

PRIORITY APPLICATION

This application is a continuation of U.S. patent application Ser. No. 15/178,387, filed Jun. 9, 2016, the disclosure of which is incorporated herein in its entirety by reference.

TECHNICAL FIELD

The subject matter disclosed herein relates to graphical user interfaces for the presentation and visualization of data. In particular, example embodiments may relate to machines configured to collect metrics data of software, and generate and display visualizations of the metrics data with a specially configured interface.

BACKGROUND

In order to identify bugs and areas that may need improvement in software products, software developers may look at usage metrics of software products at one or more user devices. Usage metrics describe what features of a software product are used and how those features are used by users of the software products.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 8 is an interface diagram illustrating a portion of a metrics visualization interface, according to some example embodiments.

FIG. 13 is an interface diagram illustrating a manual metrics submission form, according to some example embodiments.

DETAILED DESCRIPTION

Figure 1:
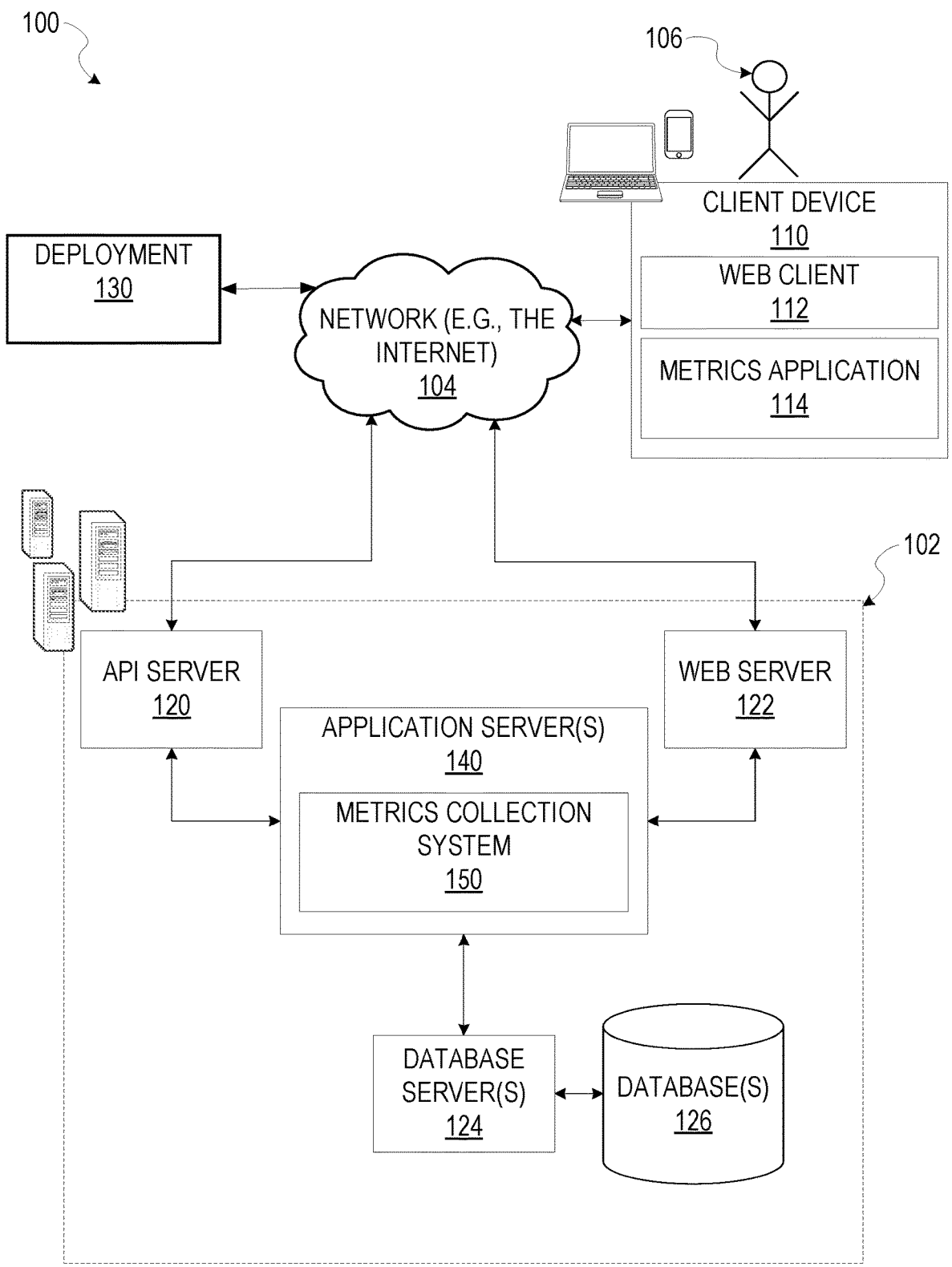
FIG. 1 is a network diagram depicting a networked system comprising one or more application servers in communication with a network-based metrics collection system configured for collecting software usage metrics data from one or more devices, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided.

As noted above, usage metrics of software products may be analyzed by software developers to identify bugs and areas which may require improvement. In cases where there are multiple software products executing at a large number of client devices, the collection and analysis of the software usage metrics quickly becomes unmanageable due to the volume and diversity of the usage metrics collected. For example, usage metrics gathered from a first client device related to a software product may be dramatically different from usage metrics of the same software product executing at a second client device, due to differences in the host systems, as well as differences in tasks being executed with the software product. Therefore, making sense of usage metrics without the aid of computer generated visualizations is time consuming and difficult—especially when considering that many of the software usage metrics gathered may pertain to intangible aspects of the software products themselves. Thus, a system and method to standardize and collect software usage metrics and to generate and cause display of visualizations of the software usage metrics would be an advantage.

Example embodiments involve a metrics collection system for collecting software usage metrics from one or more client devices at deployments. The term "deployments," as used herein, refers to a group of devices configured to execute a version of a software product. For example, a deployment may include one or more devices configured to execute one or more distinct or similar products of the same or even a different versions. A computer, such as a server configured to execute the metrics collection system, collects software usage metrics (e.g., as a metrics submission from a client device) of the software product at the deployment, identifies a metrics type of the software usage metrics collected, assigns the software usage metrics to a metrics category, and calculates and updates a metrics score of the metrics category, based on the software usage metrics collected.

The software usage metrics collected by the metrics collection system include a rate or frequency with which features of a software product are executed, a number of devices executing the software product at a deployment, a number of deployments executing versions of the software product, a number of unique users, a number of failed login attempts (e.g., by location, user, or day), a frequency of use of the software product, a frequency of crashes, bug reports, and performance metrics related to a speed or efficiency of actions of the software product. As a means of standardization, the metrics collection system may include a metrics application that executes at client devices, to quantify and format metrics submissions for the metrics collection system. The usage metrics of the metrics submissions may be based on a "Uniform Metrics Identifier" (UMI) that quantifies, based on what the software product is, what the actual metric collected is, and what the point or duration scale of the metric is, and a value of the metric.

The UMI may comprise three types of information: a group (e.g., the software product the metric is related to); a metric (e.g., what is being measured); and a duration (e.g., a timeframe over which the measurement was made, or an indication if the measurement is just a point value). For example, based on the UMI, the usage metrics may be formatted as a concatenation of strings associated with the above components, separated by ":" in the following form:
    <Group>:<Metric>:<Duration>

In some example embodiments, the "<Group>" and "<Metric>" component of the UMI can be further split out into terms separated by "." in the following form:
<G-term-1>.<G-term-2>.<G-term-N>:<M-term-1>.<M-term-2>.<M-term-N>:<Duration>

The "<Group>" string indicates what the metric is in reference to. As used herein, the "<Group>" string identifies a particular software product (e.g., from among a corpus of products). The "<Group>" portion of the UMI may consist of an arbitrarily nested set of terms that provide increasing levels of specificity from left to right. Similarly, the "<Metric>" portion of the UMI may describe what feature of the software product is being measured (e.g., a rate of use of distinct features of the software product, number of unique users, etc.) and may also consist of an arbitrarily nested set of terms that provide increasing levels of specificity from left to right.

The "<Duration>" string indicates a metrics type of the collected software usage metrics. In general, there are two types of metrics as discussed herein: point measurements and duration measurements. A point measurement refers to a metric that is taken at an instant in time (e.g., version number). For point measurements, the "<Duration>" component of the UMI may be omitted entirely. A duration measurement refers to an observation over a period of time. Duration measurements are designated in the UMI by appending the associated timeframes as a string. For example, "<Duration>" strings may include "MONTHLY," "WEEKLY," "DAILY," "HOURLY," and so on.

For each received metrics submission, the metrics collection system proceeds to identify a metrics type of the usage metrics collected based on the UMI discussed above. The metrics collection system may then assign the usage metrics of the metrics submission to an appropriate metrics category (e.g., issues, engagement, growth, etc.), based on the metrics type and information within the UMI, such as the "<Metric>" string. For example, an administrator of the metrics collection system may provide metrics category definitions that assign all metrics related to a number of login attempts, a number of program crashes, and a number of software reboots of a software product at a deployment to a "issues" metrics category, and the administrator may assign a rate of increase in usage, a rate of increase of unique users, and a number of systems that upgrade to a newer version of the software product to the "growth" metrics category. As the metrics collection system receives metrics submissions, the metrics collection system may categorize the software usage metrics data of the metrics submissions into categories based on the corresponding UMI, and category definitions provided by an administrator of the metrics collection system. The metrics collection system calculates a metrics score of each metrics category based on the usage metrics collected.

In some example embodiments, the metrics collection system generates and causes display of a graphical user interface at a client device to receive visualization requests. For example, the graphical user interface displayed at the client device may include a set of menus configured to receive visualization requests, wherein the visualization requests include an indication of a metrics category, a deployment, a timeframe or duration, and a visualization type. In response to receiving the visualization request, the metrics collection system generates and causes display of the visualization within the graphical user interface at the client device.

FIG. 1 is a network diagram illustrating a network environment 100 suitable for operating a metrics collection system 150, according to some example embodiments. A networked system 102 provides server-side functionality, via a network 104 (e.g., an intranet, the Internet, or a Wide Area Network (WAN)), to one or more clients such as a client device 110 (operable by a user 106) and a deployment 130. FIG. 1 illustrates a web client 112 and a metrics application 114 executing on the client device 110.

An Application Program Interface (API) server 120 and a web server 122 are coupled to, and provide programmatic and web interfaces respectively to, one or more application servers 140. The application servers 140 host the metrics collection system 150. The application servers 140 are, in turn, shown to be coupled to one or more database servers 124 that facilitate access to one or more databases 126.

The metrics collection system 150 performs operations that include receiving metrics submissions that include software usage metrics from the deployment 130 and the client device 110, identifying a metrics type of the software usage metrics, categorizing the software usage metrics, and generating and causing display of a visualization of the software usage metrics within a graphical user interface, for the networked system 102. The deployment 130 may be or include a database (e.g., similar to the database 126). In some example embodiments, the deployment 130 includes a web server machine operated by a third party (e.g., an entity distinct from the metrics collection system 150).

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by the user 106 (e.g., a person) to exchange data with the networked system 102 over the network 104.

The client device 110 communicates with the network 104 via a wired or wireless connection. For example, one or more portions of the network 104 may comprise an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with the web client 112 (e.g., a browser) or the metrics application 114, executing on the client device 110, and in communication with the networked system 102. In further embodiments, the UIs may be served to the client device 110 through an encrypted transport layer (i.e., SSL.TLS).

Turning specifically to the networked system 102, the web server 122 is coupled to (e.g., via wired or wireless interfaces), and provides web interfaces to, the application server 140. In some embodiments, the metrics collection system 150 runs and executes on the application server 140, while in other embodiments, the application server 140 provides the client device 110 with a set of instructions (e.g., computer-readable code) that causes the web client 112 and the metrics application 114 of the client device 110 to execute and run the metrics collection system 150.

Figure 2:
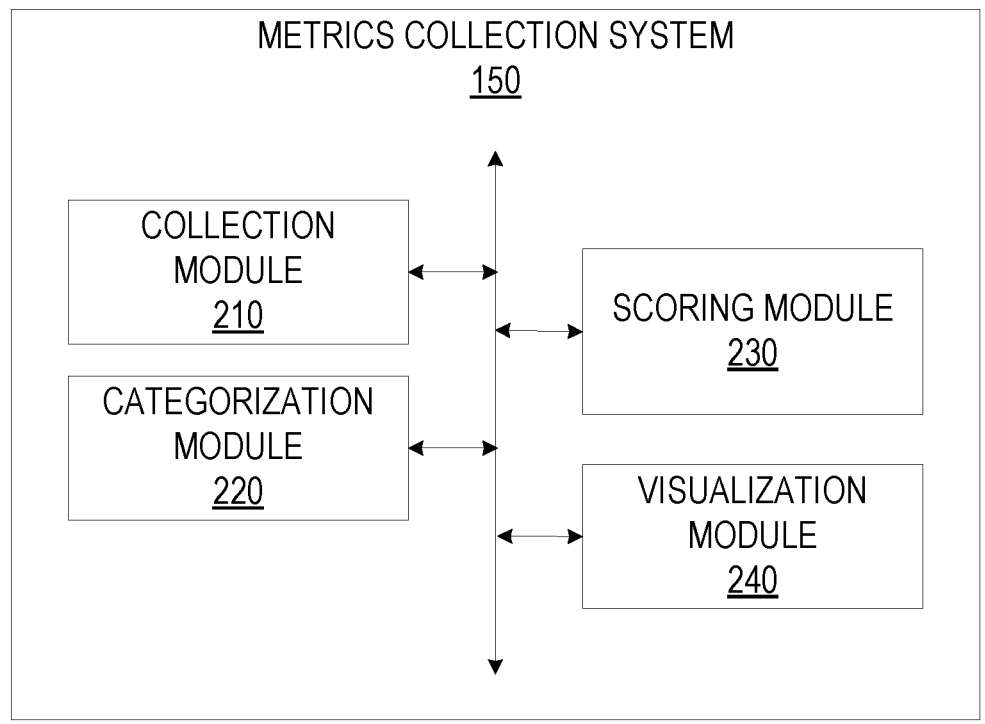
FIG. 2 is a block diagram illustrating various components of the metrics collection system, which is provided as part of the networked system, according to some example embodiments.

FIG. 2 is a block diagram illustrating various components of the metrics collection system 150, which is provided as part of the networked system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the metrics collection system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and a processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The metrics collection system 150 is shown as including a collection module 210, a categorization module 220, a scoring module 230, and a visualization module 240, all configured to communicate with each other (e.g., via a bus, shared memory, a switch, or APIs).

The collection module 210 obtains metrics submissions from multiple data sources. Data sources for metrics submission data that includes software usage metrics include the deployment 130, as well as the client device 110. The deployment 130 may comprise a set of devices executing one or more software products. The metrics submissions include software usage metrics, formatted based on the UMI (as discussed above).

The categorization module 220 identifies a data type of the software usage metrics of the metrics submission based on the UMI, and assigns the software usage metrics to a metrics category. Metrics categories may include, but are not limited to, "issues," "growth," "engagement," and "performance." In some example embodiments, an administrator of the metrics collection system 150 may provide additional metrics category definitions to the categorization module 220. Metrics category definitions include a metrics category identifier, and a corresponding list of features from the UMI for the metrics category identifier. In this way, an administrator of the metrics collection system 150 may define new metrics categories, or add features to existing metrics categories.

The scoring module 230 calculates a metrics score of each metrics category of each deployment, each individual system, and each software product. The score calculated by the scoring module 230 is based on the software usage metrics collected by the collection module 210. For example, the scoring can be done on an aggregated level to aggregate metrics themselves. Consider an example embodiment in which a deployment (e.g., deployment A) includes two devices (e.g., first device and second device) that are running a software product (e.g., Software Product A). The first device may report ten unique users in a particular week and the second device may report thirty unique users in the same week, where each metric (i.e., unique user logins) is an aggregate of login events on each device. The scoring module 230 may thereby apply a scoring calculation to quantify all deployments running "Software Product A," or vice versa, all software products installed on Deployment A itself, in order to calculate a state/score for the quantification. In some embodiments, the scoring calculation may manifest as an algorithm that causes the scoring module 230 to count all instances of "Software Product A" running with more than fifteen users, and give the client device one point, then sum the points up for all devices to get a score.

The visualization module 240 receives visualization requests from one or more client devices. The visualization requests include indications of a visualization type (e.g., bar graph), a metrics category or feature, and a time period. The visualization module 240 generates and causes display of a visualization at the client device (e.g., client device 110) based on the visualization request.

Figure 3:
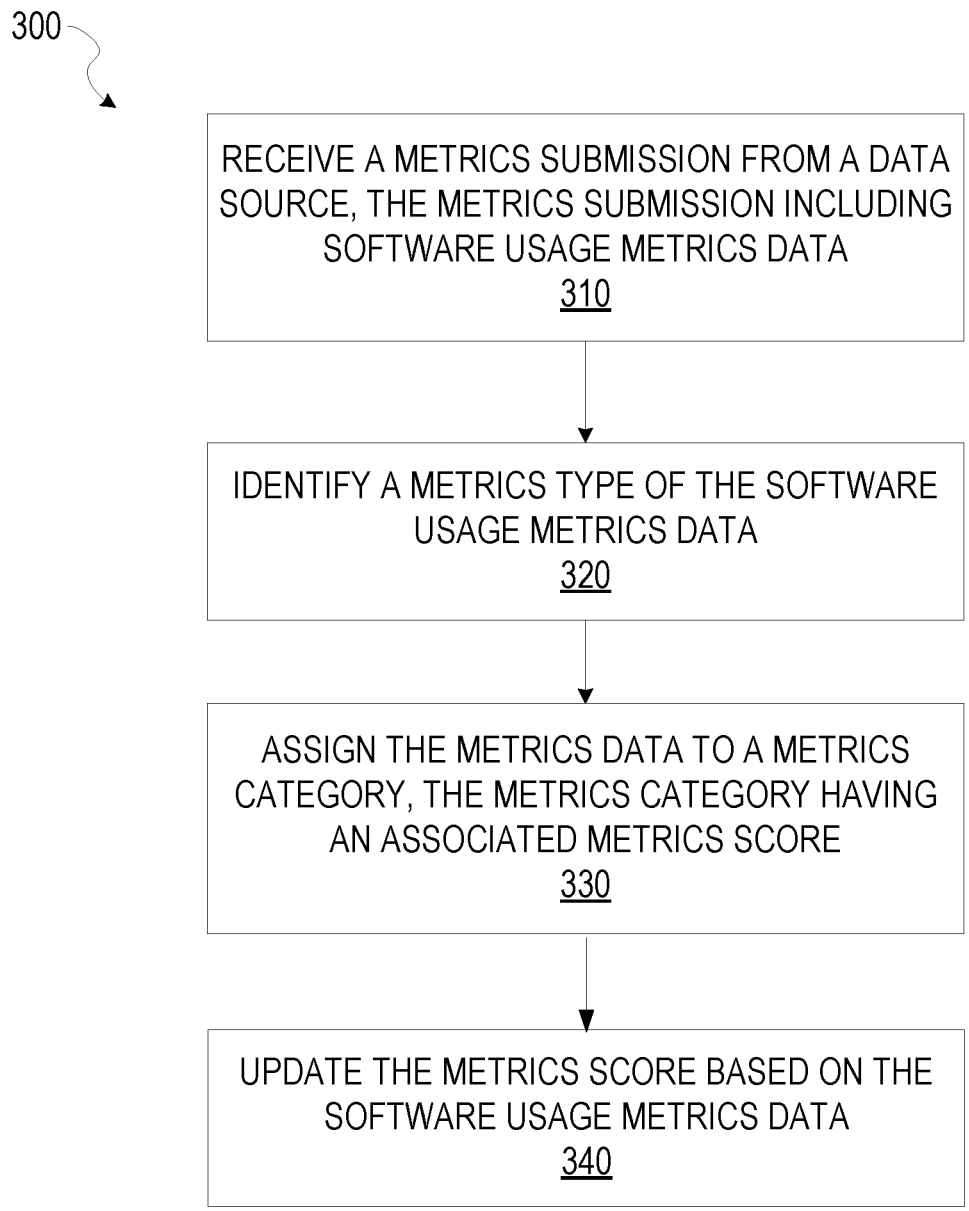
FIG. 3 is a flowchart illustrating a method for collecting software usage metrics data from a deployed system, and updating a metrics score associated with the software usage metrics data, according to some example embodiments.

FIG. 3 is a flowchart illustrating operations of the metrics collection system 150 in performing a method 300 for collecting software usage metrics from a data source (e.g., a deployment), categorizing the usage metrics, and updating a metrics score associated with the metrics category corresponding to the usage metrics, according to some example embodiments. The method 300 is embodied in computer-readable instructions for execution by one or more processors, such that the operations of the method 300 are performed in part or in whole by the metrics collection system 150; accordingly, the method 300 is described below by way of example with reference thereto. However, it shall be appreciated that at least some of the operations of the method 300 may be deployed on various other hardware configurations, and the method 300 is not intended to be limited to the metrics collection system 150.

At operation 310, the collection module 210 receives a metrics submission from a data source. The metrics submission may be delivered to the metrics collection system 150 as an e-mail, as a manual user submission, or through a distributed queue messaging service. For example, manual user submissions may be accomplished via API through a front end GUI. Message queues provide an asynchronous communications protocol, meaning that the sender and receiver of the message do not need to interact with the message queue at the same time. Messages placed onto the queue are stored until the recipient retrieves them. Message queues have implicit or explicit limits on the size of data that may be transmitted in a single message and the number of messages that may remain outstanding on the queue.

As an example of the forgoing operation, the metrics application 114 may cause display of a graphical user interface configured to receive and transmit metrics submissions at a client device 110. The user 106 of the client device 110 may submit a metrics submission (e.g., a UMI) to the metrics collection system 150 through the interface. The software usage metrics are then collected automatically by the metrics application 114, and delivered to the metrics collection system 150 through the network 104. For example, the metrics application 114 may monitor various metrics features of a software product (or multiple software products) executing on the client device 110 (or at the deployment 130). The metrics application 114 may then deliver the software usage metrics collected to the collection module 210 as a metrics submission (e.g., UMI).

At operation 320, the categorization module 220 identifies a metrics type of the software usage metrics within the metrics submission, based on a UMI. As discussed above, the UMI includes a field indicating a metrics type of the software usage metrics collected. The categorization module 220 parses the metrics submission received by the collection module 210 to identify the metrics type.

At operation 330, the categorization module 220 categorizes the software usage metrics data of the metrics submission based on the UMI. As discussed above, the UMI includes a field that identifies the specific feature being measured. The categorization module 220 accesses a list of metrics category definitions, and based on the metrics category definitions and the UMI, categorizes the software usage metrics data. The categorization module 220 may, in some instances, assign the software usage metrics data of the metrics submission to multiple metrics categories.

At operation 340, the scoring module 230 calculates a metrics score of the metrics category (or categories). The metrics score is based on the software usage metrics values collected by the collection module 210.

Figure 4:
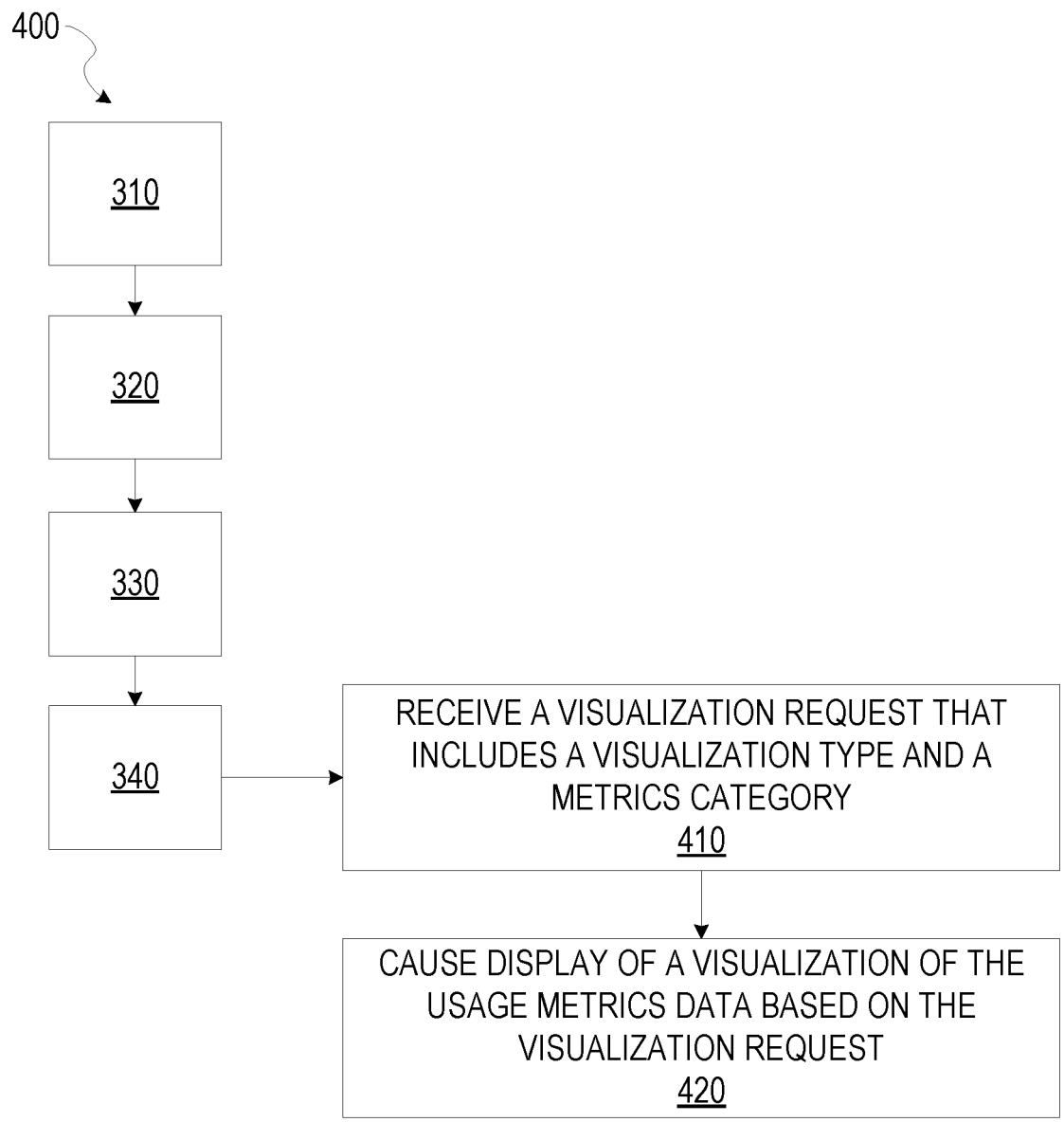
FIG. 4 is a flowchart illustrating a method for causing display of a visualization of software usage metrics data, according to some example embodiments.

FIG. 4 is a flowchart illustrating a method 400 for generating and causing display of a visualization of software usage metrics data at a client device 110, according to some example embodiments. As shown in FIG. 4, one or more operations 410 and 420 may be performed as part (e.g., a precursor task, a subroutine, or a portion) of operation 340, in which the scoring module 230 updates a metrics score of the metrics categories based on metrics submissions collected by the collection module 210, according to some example embodiments.

At operation 410, the visualization module 240 receives a visualization request from a client device (e.g., client device 110). The visualization request may include a set of visualization criteria, such as a visualization type, as well as an indication of a deployment or client device, metrics category, feature to visualize, and software product identifier. In some example embodiments, the visualization module 240 causes display of a visualization interface at a client device (e.g., the client device 110). A user of the client device 110 may provide the visualization criteria through one or more interface elements of the visualization interface. The interface elements may include drop down menus, text fields, and user selectable icons.

At operation 420, in response to receiving the visualization request, the visualization module 240 generates and causes display of a visualization of the software usage metrics data at the client device 110. Examples of visualizations generated and displayed by the visualization module 240 can be seen in FIGS. 8-11. In some embodiments, the visualization module 240 receives a selection of a visualization type (e.g., bar graph), and generates a visualization based on the selection. In some embodiments, the visualization module 240 may select a visualization type based on elements of the visualization request itself, such as the deployment or product selected.

Figure 5:
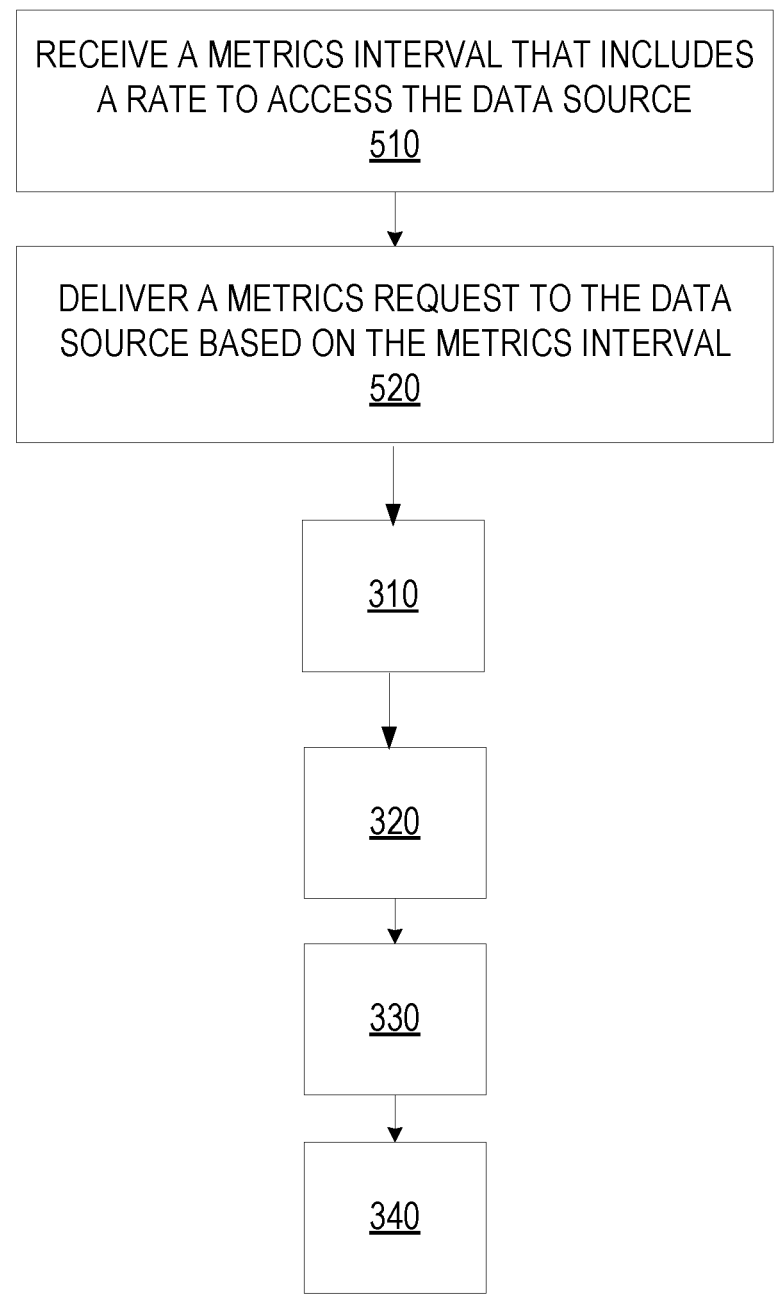
FIG. 5 is a flowchart illustrating a method for defining a metrics interval of the metrics collection system, according to some example embodiments.

FIG. 5 is a flowchart illustrating a method 500 for defining a metrics interval to receive metrics submissions, according to some example embodiments. As shown in FIG. 5, one or more operations 510 and 520 may be performed as part (e.g., a precursor task, a subroutine, or a portion) of operation 310, in which the collection module 210 receives a metrics submission from a data source, according to some example embodiments.

Figure 12:
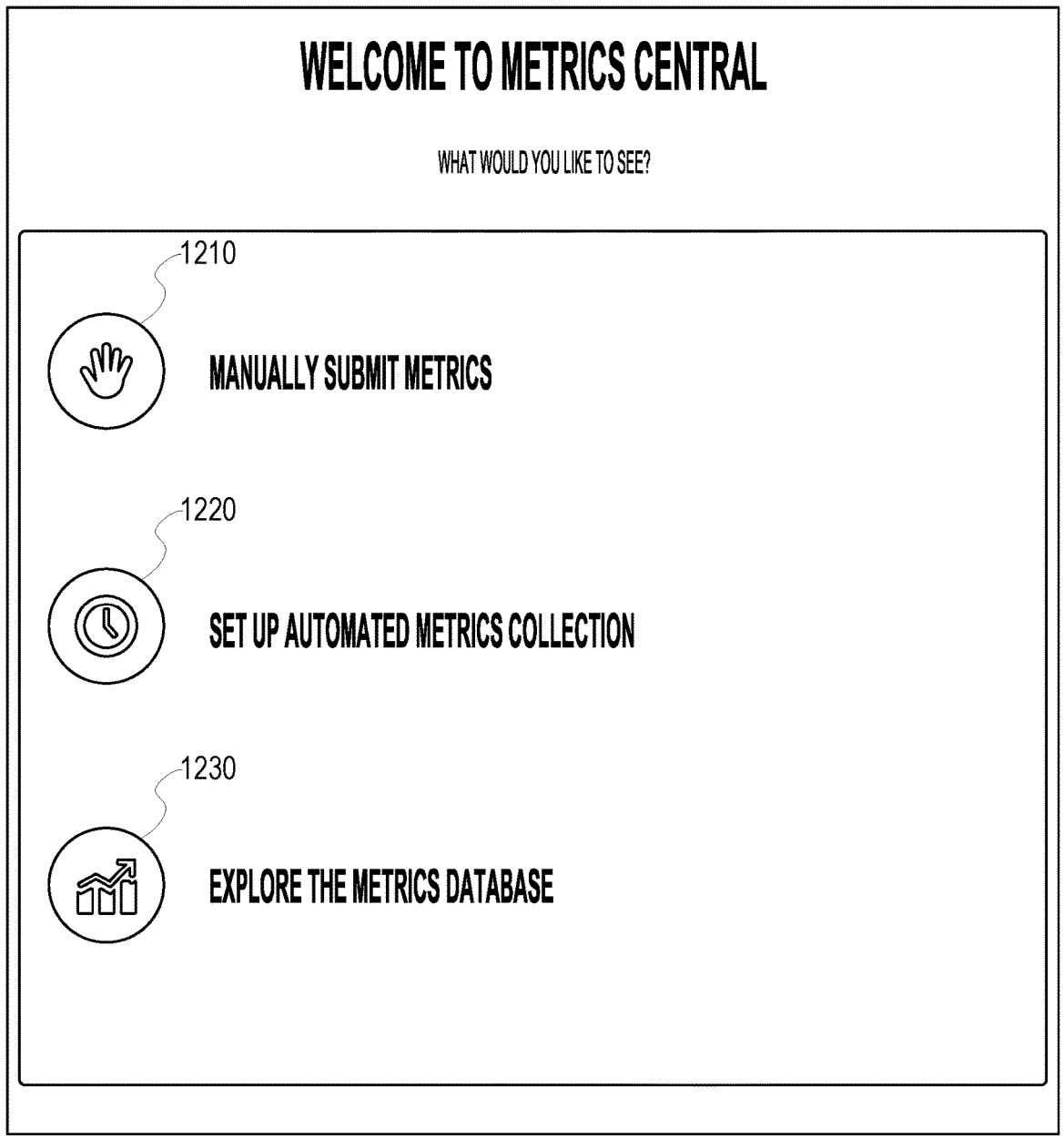
FIG. 12 is an interface diagram illustrating a metrics submission interface, according to some example embodiments.

At operation 510, the collection module 210 receives an automated metrics interval that includes a rate at which to access a data source (e.g., deployment 130, client device 110). For example, to receive the automated metrics interval, the collection module 210 may cause display of a metrics interface to set up automated metrics submissions (as seen in FIG. 12) at a client device. A user may provide a metrics interval definition through the metrics interface to define an automated metrics interval at which to collect and transmit metrics submissions to the metrics collection system 150. For example, the metrics interval definition may include "weekly," as well as "daily." In some example embodiments, the metrics interval definition includes a feature, a software product, a deployment, and a rate at which to collect and provide metrics submissions. In some embodiments, the metrics interval definition configures the metrics application 114 to collect and transmit metrics submissions at the defined rate. In some embodiments, the metrics interval definition configures the collection module 210 to query a data source for the requested metrics based on the metrics interval definition.

At operation 520, based on the metrics interval definition received from the client device 110 through the metrics interface, the collection module 210 delivers a metrics request to the data source (e.g., deployment 130, client device 110). The metrics request includes a feature, a metrics type, a software product, and a period of time over which to retrieve software usage metrics data. Based on the metrics request, the data source provides a metrics submission to the collection module 210.

Figure 6:
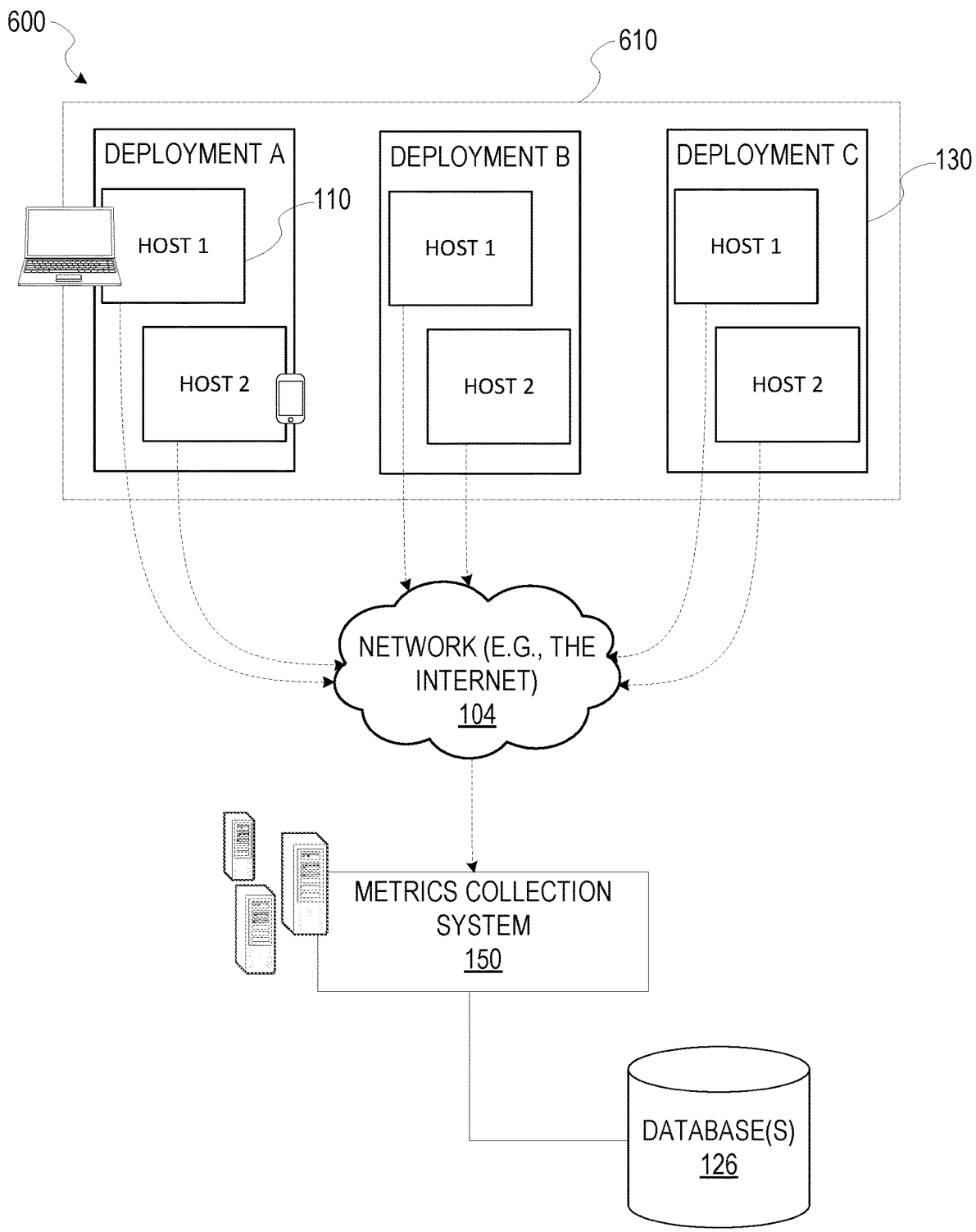
FIG. 6 is a diagram illustrating various interactions between deployed systems and the metrics collection system, according to some example embodiments.

FIG. 6 is a system diagram 600 illustrating various interactions between deployments 610 and the metrics collection system 150, according to some example embodiments. As seen in FIG. 6, the deployments 610 may include one or more deployments (e.g., deployment A, deployment B, deployment C), each comprising one or more host systems (e.g., host 1, host 2). The host systems may include the client device 110, and the deployments 610 may include deployment 130, as seen in FIG. 1. In some example embodiments, each host system may contain one to N metrics applications that may or may not be unique from one another.

The deployments 610 comprise data sources of software usage metrics data for the metrics collection system 150. For example, the deployment 130 of FIG. 6 may comprise a grouping of systems configured to execute a software platform consisting of one or more products. The systems may be grouped based on being a part of the same company or organization, team within a company, or building.

Software usage metrics data in the form of metrics submissions flow from the deployments 610, through the network 104, and into the metrics collection system 150 based on the methods 300, 400, and 500 discussed in FIGS. 3-5. The metrics collection system 150 receives the metrics submissions, and stores the software usage metrics data within the database 126.

Figure 7:
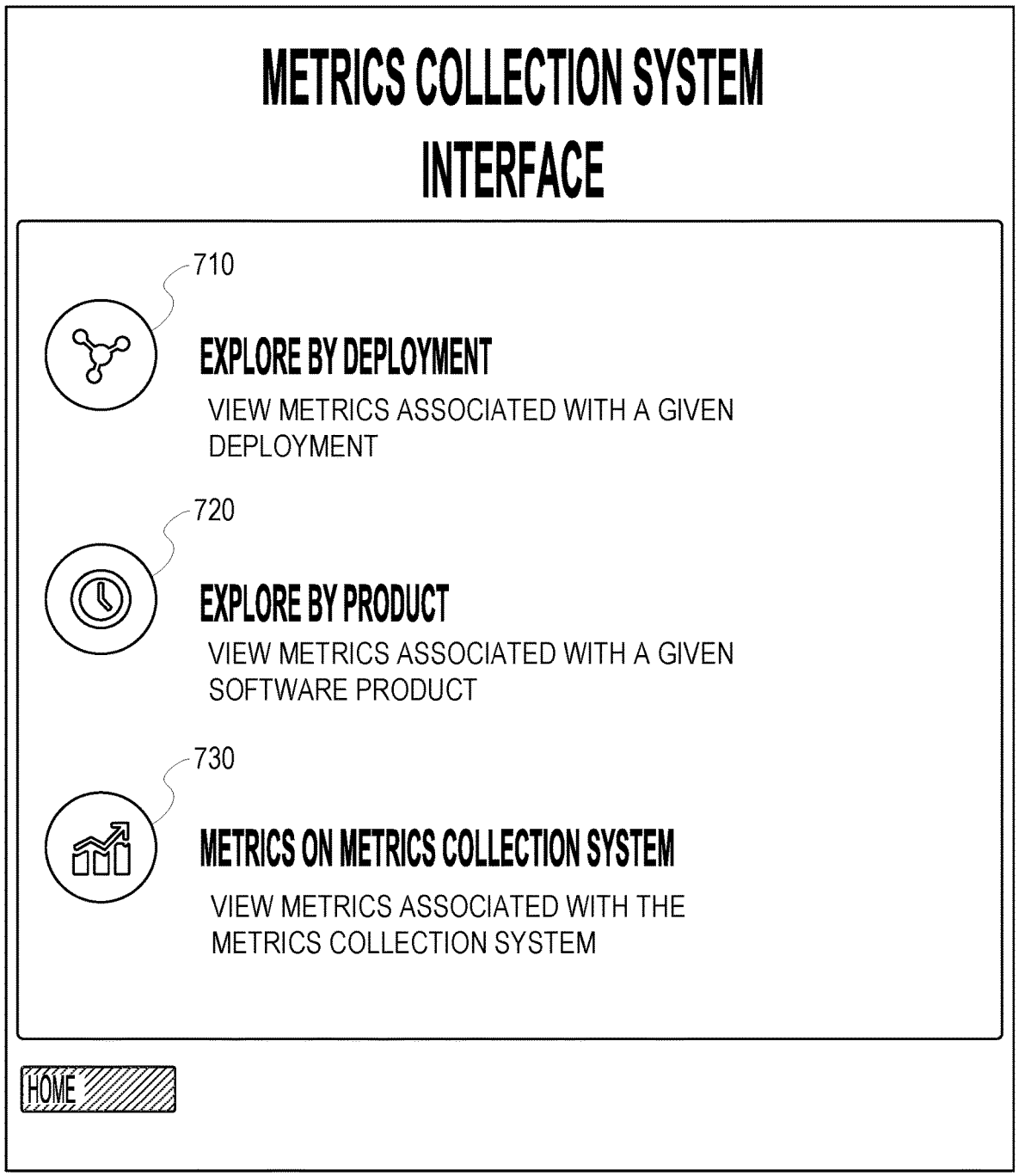
FIG. 7 is an interface diagram illustrating a metrics collection interface, according to example embodiments.

FIG. 7 is an interface diagram illustrating a metrics collection interface 700, according to example embodiments. As shown, the metrics collection interface 700 includes a set of interface elements 710, 720, and 730 configured to receive user inputs to generate and cause display of visualizations of software usage metrics data at a client device 110.

The interface element 710 allows users to submit visualization requests for software usage metrics associated with a deployment. For example, a deployment may execute one or more software products on a number of systems associated with the deployment. A user may select the interface element 710, and in response, be presented with a selectable list of deployments (e.g., deployment 130). By selecting a deployment from the list, the user may be presented with one or more visualization options in order to generate and cause display of a visualization of software usage metrics associated with the selected deployment.

The interface element 720 allows users to submit to visualization requests for software usage metrics associated with a software product across multiple deployments. For example, a single software product may be used in multiple deployments. A user may choose to visualize how the software product is being used across the multiple deployments by selecting the interface element 720. A software product may include a computer program executing at a device (e.g., client device 110).

The interface element 730 allows users to view software usage metrics of the metrics collection system 150, and the metrics application 114. For example, a user may select the interface element 730, and in response be presented with an interface to view software usage metrics of the metrics collection system 150 and metrics application 114.

FIG. 8 is an interface diagram illustrating a metrics visualization interface 800, according to example embodiments. As shown, the metrics visualization interface 800 includes a group selection menu 810 configured to receive a selection of a group identifier (e.g., deployment A), feature identifiers 820 and 830, and a product identifier 840. The metrics visualization interface 800 may be presented at a client device 110 in response to a selection of the interface element 720 of FIG. 7.

Selection of the group selection menu 810 may cause display of a listing of available group identifiers. Each group identifier may correspond to a unique deployment that comprises one or more systems executing software products. For example, if group identifier "deployment A" is selected from the group selection menu 810, the metrics collection system 150 accesses the database 126 to retrieve and present a list of software products executing on devices associated with deployment A. For example, deployment A may have one or more associated devices which execute products 1-5, as show in FIG. 8.

If a product identifier is selected from among the list of product identifiers (e.g., product identifier 840), the metrics collection system 150 causes display of visualizations 850 and 860, based on the feature identifiers 820 and 830. For example, the visualization 850 may depict a visualization of software usage metrics related to the feature identifier 820 (total document views per week) of software product 1. If the product identifier 840 is selected, the metrics visualization interface 800 updates to include visualizations based on software usage data that corresponds to the selected product identifier (e.g., product identifier 840).

Figure 9:
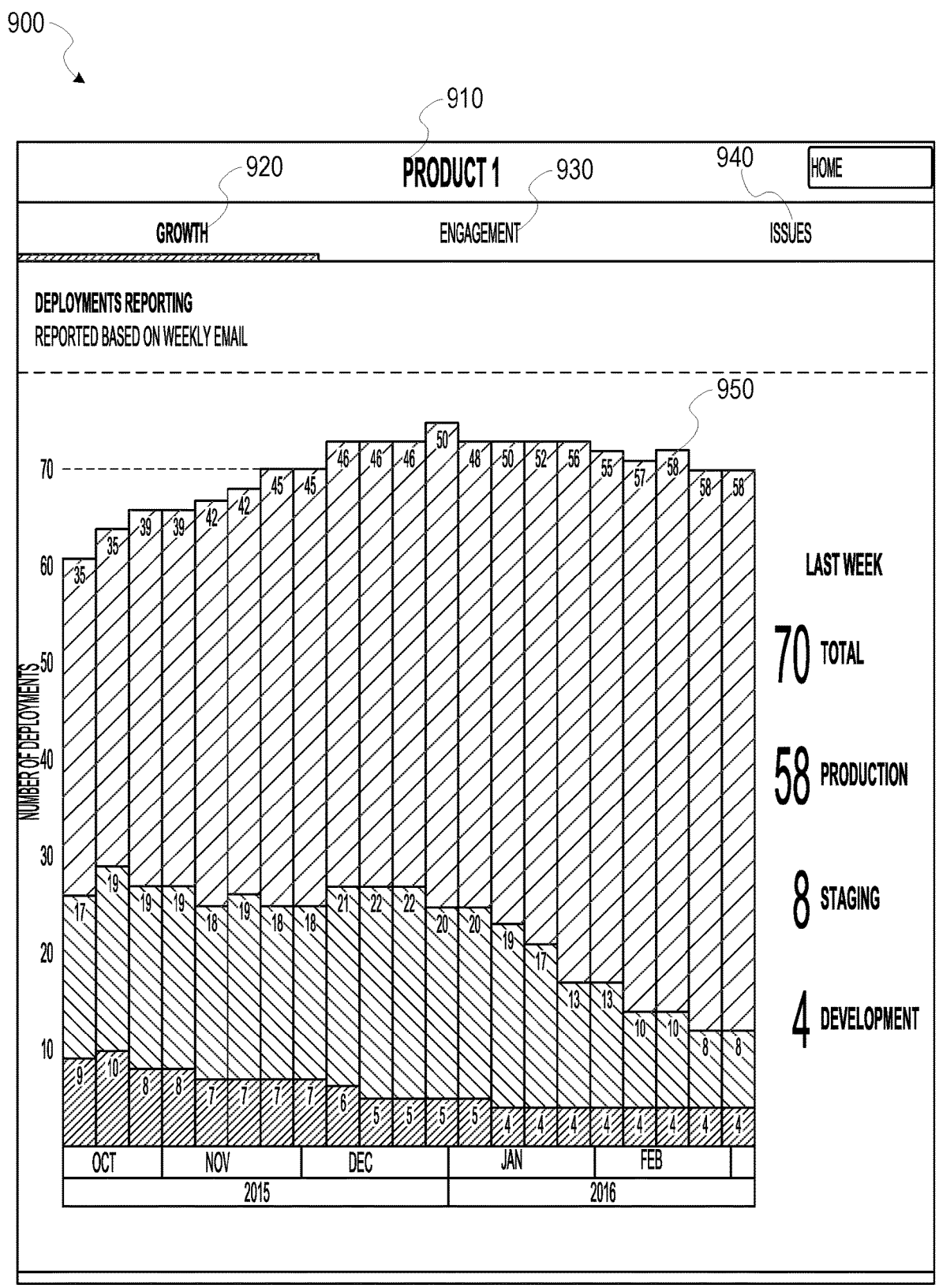
FIG. 9 is an interface diagram illustrating a portion of a metrics visualization interface, according to some example embodiments.

FIG. 9 is an interface diagram illustrating a metrics visualization interface 900, according to example embodiments. As shown, the metrics visualization interface 900 includes a product identifier 910, metrics category identifiers 920, 930, and 940, and a visualization 950. The metrics visualization interface 900 may be presented at a client device 110 in response to a selection of the interface element 720 of FIG. 7.

The metrics visualization interface 900 presents software product-specific metrics (of software product 1), across all deployments which are executing the software product. As shown in FIG. 9, the metrics visualization interface 900 includes a presentation of the metrics category identifiers 920, 930, and 940. As discussed above, the metrics categories may be defined by an administrator of the metrics collection system 150, by methods discussed above in reference to the categorization module 220 depicted in FIG. 2.

A user may select a metrics category identifier (e.g., metrics category identifier 920), and in response the metrics collection system 150 may update the metrics visualization interface 900 to display visualizations generated based on software usage metrics of features related to the selected metrics category.

Figure 10:
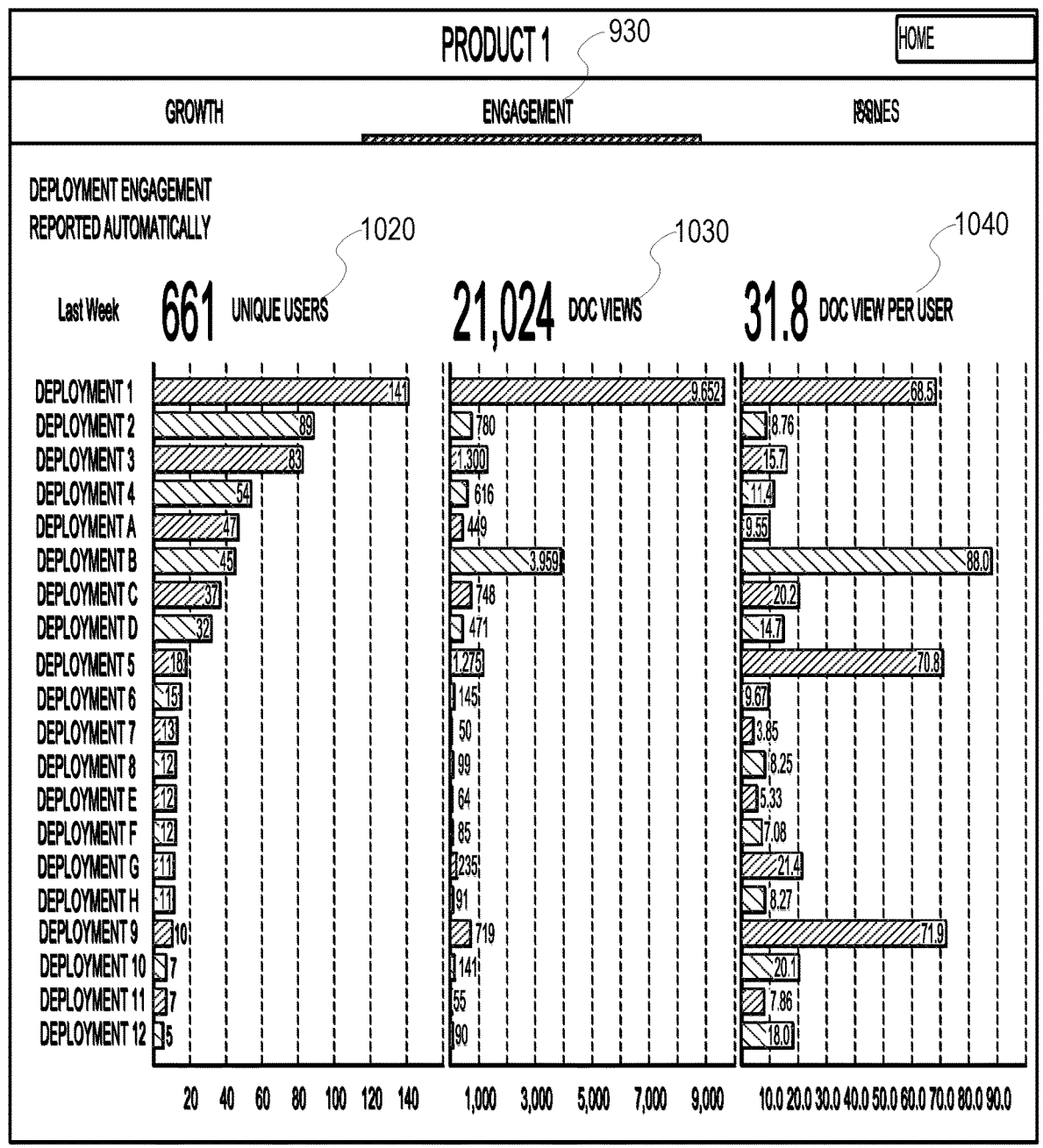
FIG. 10 is an interface diagram illustrating a portion of a metrics visualization interface, according to some example embodiments.
Figure 11:
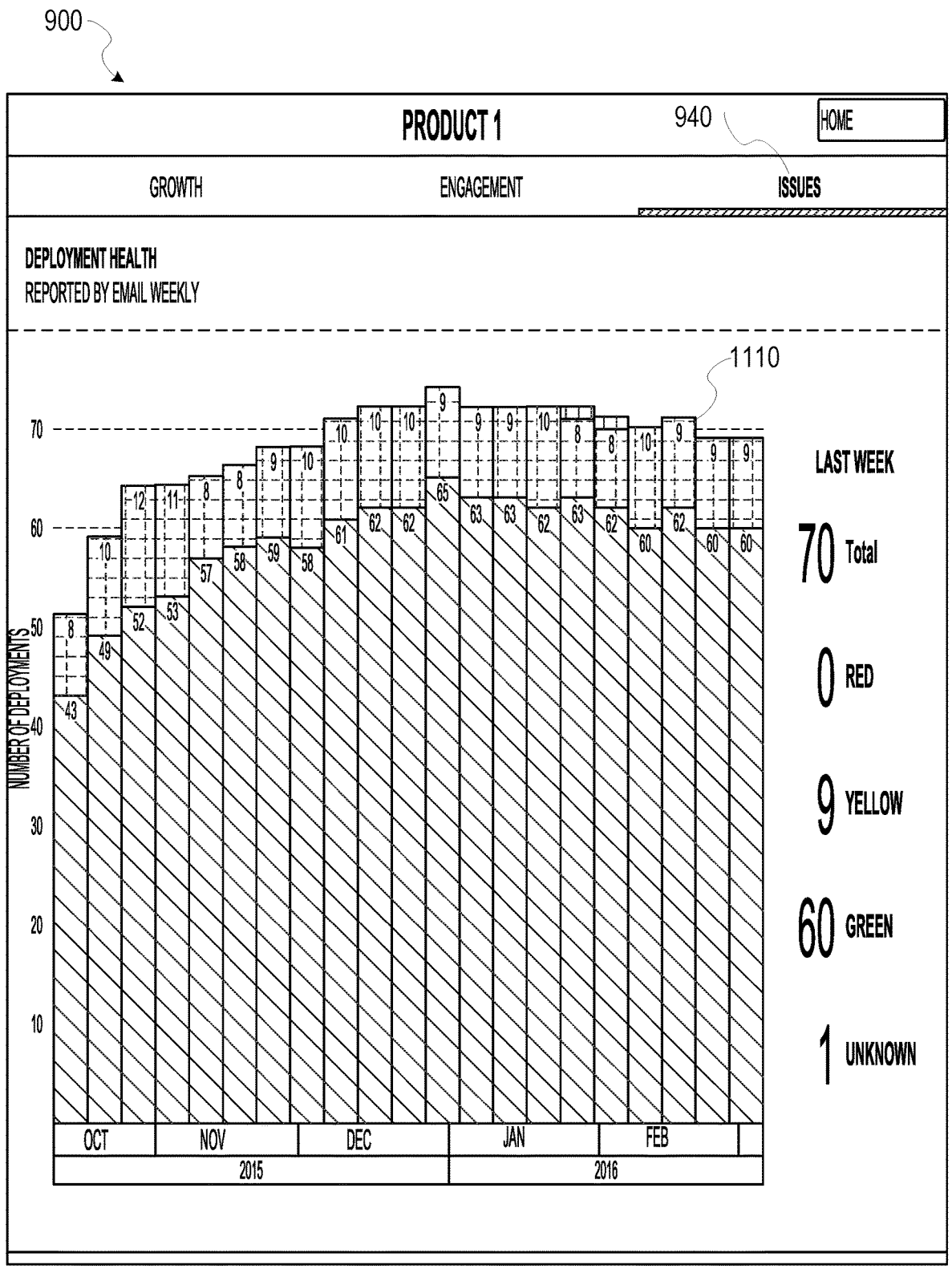
FIG. 11 is an interface diagram illustrating a portion of a metrics visualization interface, according to some example embodiments.

For example, if the user selects the metrics category identifier 930, the metrics visualization interface 900 may update to display visualizations of features 1020, 1030, and 1040 of FIG. 10, based on the metrics category identifier 930 (e.g., engagement metrics). As seen in FIG. 10, the metrics category identifier 930 includes features 1020 (e.g., unique users), 1030 (e.g., document views), and 1040 (document views per user). As explained above, the features 1020, 1030, and 1040 are associated with the metrics category identifier 930 by an administrator of the metrics collection system 150. Similarly, if the user selects the metrics category identifier 940, the metrics visualization interface 900 updates to display a visualization 1110 as shown in FIG. 11, based on software usage metrics data of features associated with the pain metrics category.

FIG. 12 is an interface diagram illustrating a metrics collection interface 1200, according to example embodiments. As shown, the metrics collection interface 1200 includes a set of interface elements 1210, 1220, and 1230 configured to receive user inputs to provide metrics submissions to the metrics collection system 150, according to example embodiments.

Selection of the interface element 1210 causes the metrics collection interface 1200 to display a manual metrics submission form 1300, as seen in FIG. 13. A user may provide metrics submissions manually to the metrics collection system 150, through the manual metrics submission form 1300. The metrics submission may thereby be delivered to the metrics collection system 150 electronically, via email or other similar electronic delivery methods.

Selection of the interface element 1220 causes the metrics collection interface 1200 to display an interface to receive automated metrics, according to the method 500 depicted in FIG. 5. Upon receiving the automated metrics instructions through the interface, the metrics collection system 150 configures itself, or in some embodiments a client device 110 executing a metrics application 114, to retrieve metrics submissions of requested features at defined intervals.

Selection of the interface element 1230 causes the metrics collection interface 1200 to display one or more interface elements to view software usage metrics existing within the metrics collection system 150, at the database 126.

FIG. 13 is an interface diagram illustrating a manual metrics submission form 1300, to manually submit a metrics submission to the metrics collection system 150, according to example embodiments. The manual metrics submission form 1300 includes: a deployment menu 1310; interface elements 1320; 1330, and 1340 to receive metrics submission details as user inputs; a submission result indicator 1350; and a display of historical data 1360, according to example embodiments.

A user 106 of the client device 110, configured to display the manual metrics submission form 1300, may provide metrics submission details through the interface elements 1320, 1330, and 1340. The interface elements may correspond to metrics submission information such as a date of the software usage metrics being submitted (e.g., 1320), a version of the software product which the software usage metrics are associated with (e.g., 1330), and software usage metrics features, such as "unique weekly logins," (e.g., 1340). Upon receiving the metrics submission through the manual metrics submission form 1300, the submission result indicator 1350 updates to display a status of the submission (e.g., success, failed, etc.). The display of historical data 1360 may also update to include the metrics submitted.

Figure 14:
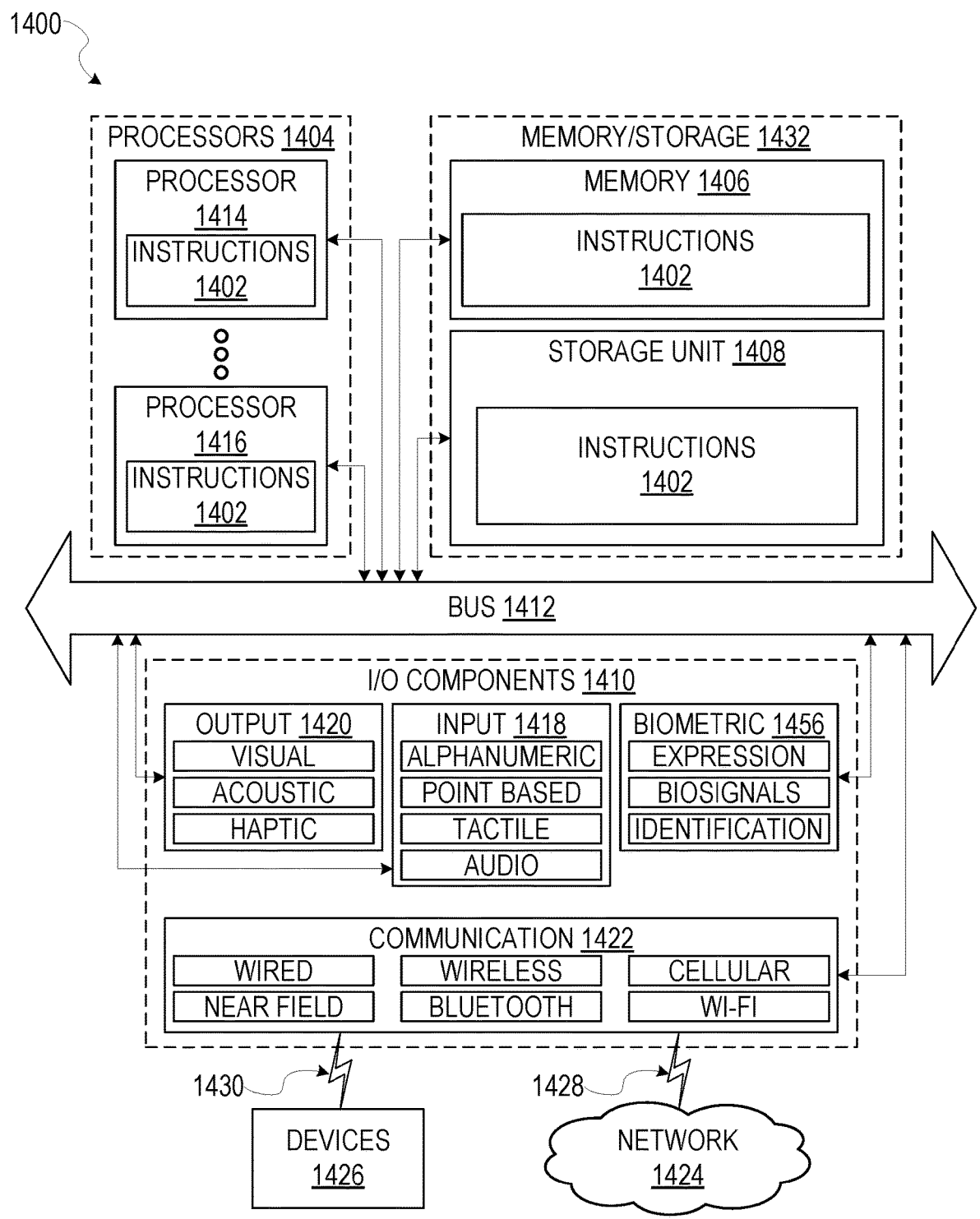
FIG. 14 is a diagrammatic representation of a machine in the example form of a computer system within which a set of instructions for causing the machine to perform any one or more of the methodologies discussed herein may be executed.

FIG. 14 is a diagrammatic representation of a machine 1400 in the example form of a computer system within which a set of instructions for causing the machine to perform any one or more of the methodologies discussed herein may be executed. Specifically, FIG. 14 shows a diagrammatic representation of the machine 1400 in the example form of a system, within which instructions 1402 (e.g., software, a program, an application, an applet, an app, a driver, or other executable code) for causing the machine 1400 to perform any one or more of the methodologies discussed herein may be executed. For example, the instructions 1402 include executable code that causes the machine 1400 to execute the methods illustrated in FIGS. 3-5. In this way, these instructions 1402 transform the general, non-programmed machine into a particular machine programmed to carry out the described and illustrated functions in the manner described herein. The machine 1400 may operate as a standalone device or may be coupled (e.g., networked) to other machines.

By way of non-limiting example, the machine 1400 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 1402, sequentially or otherwise, that specify actions to be taken by the machine. Further, while only a single machine 1400 is illustrated, the term "machine" shall also be taken to include a collection of machines 1400 that individually or jointly execute the instructions 1402 to perform any one or more of the methodologies discussed herein.

The machine 1400 may include processors 1404, a memory/storage 1432, memory 1406, a storage unit 1408, and I/O components 1410, which may be configured to communicate with each other such as via a bus 1412. In an example embodiment, the processors 1404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1414 and a processor 1416 that may execute the instructions 1402. The term "processor" is intended to include multi-core processors that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory 1406 (e.g., a main memory or other memory storage) and the storage unit 1408 are both accessible to the processors 1404 such as via the bus 1412. The memory 1406 and the storage unit 1408 store the instructions 1402 embodying any one or more of the methodologies or functions described herein. In some embodiments, the database 126 resides on the storage unit 1408. The instructions 1402 may also reside, completely or partially, within the memory 1406, within the storage unit 1408, within at least one of the processors 1404 (e.g., within the processor's cache memory), or any suitable combination thereof, during execution thereof by the machine 1400. Accordingly, the memory 1406, the storage unit 1408, and the memory of the processors 1404 are examples of machine-readable media.

As used herein, "machine-readable medium" means a device able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store the instructions 1402. The term "machine-readable medium" shall also be taken to include any medium, or combination of multiple media, that is capable of storing instructions (e.g., instructions 1402) for execution by a machine (e.g., machine 1400), such that the instructions, when executed by one or more processors of the machine (e.g., processors 1404), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 1410 may include a wide variety of components to receive input, provide output, produce output, transmit information, exchange information, capture measurements, and so on. The specific I/O components 1410 that are included in a particular machine will depend on the type of machine. For example, portable machines such as mobile phones will likely include a touch input device or other such input mechanisms, while a headless server machine will likely not include such a touch input device. It will be appreciated that the I/O components 1410 may include many other components that are not specifically shown in FIG. 14. The I/O components 1410 are grouped according to functionality merely for simplifying the following discussion and the grouping is in no way limiting. In various example embodiments, the I/O components 1410 may include input components 1418 and output components 1420, as well as biometric components 1456. The input components 1418 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components, and the like. The output components 1420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 1410 may include communication components 1422 operable to couple the machine 1400 to a network 1424 or devices 1426 via a coupling 1428 and a coupling 1430, respectively. For example, the communication components 1422 may include a network interface component or another suitable device to interface with the network 1424. In further examples, the communication components 1422 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1426 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors; and
   a memory comprising instructions which, when executed by the one or more processors, cause the one or more processors to perform operations comprising:
     receiving an input that selects an identifier associated with a deployment from within a dropdown menu presented within a graphical user interface (GUI), the deployment comprising a plurality of client devices;

assigning a metrics submission interval to the identifier associated with the deployment that comprises the plurality of client devices of the deployment in response to the input that selects the identifier associated with the deployment;

querying each of the plurality of client devices based on the metrics submission interval assigned to the identifier associated with the deployment;

receiving a metrics submission from a client device from among the plurality of client devices;

assigning the metrics submission received from the client device from among the plurality of client devices to a metrics category, the metrics category comprising a plurality of metrics submissions;

generating a score of the metrics category based on the plurality of metrics submissions that include the metrics submission received from the client device;

determining a visualization type based on at least the deployment; and causing display of a presentation of the score of the metrics category based on the visualization type.

2. The system of claim 1, wherein the receiving the input that selects the identifier associated with the deployment includes:

causing display of a metrics collection interface, the metrics collection interface including a presentation of a list of deployment identifiers, the list of deployment identifiers including the identifier associated with the deployment; and receiving a selection of the deployment identifier from among the list of deployment identifiers.

3. The system of claim 1, wherein
the metrics submission comprises at least a duration string that indicates a metrics type of the metrics submission.

4. The system of claim 1, wherein the operations further comprise:

causing display of a visualization of the metrics submission based on a metrics type of the metrics submission.

5. The system of claim 1, wherein the generating the score of the metric category further comprises:

applying a scoring calculation to quantify each of the deployments, wherein the scoring calculation comprises of an algorithm that counts all instances of a software application running with a plurality of users;

assigning a point to each client device running the software application running with the plurality of users; and summing, using the algorithm, the points for the plurality of client devices to generate the score.

6. The system of claim 3, wherein the metrics submission further comprises indications of one or more of:

a frequency of use of a software application executed by the client device;

a number of unique users of the software application at the client device; and a list of actions executed with the software application at the client device.

7. The system of claim 3, wherein the metrics submission further comprises a feature identifier, a product identifier, and the identifier of the deployment, and the operations further comprise:

receiving a request that includes an identification of one or more of the feature identifier, the product identifier, and the identifier of the deployment from the metrics submission; and generating a visualization of the metrics submission in response to the request.

8. A non-transitory machine-readable storage medium comprising instructions that, when executed by one or more processors of a machine, cause the machine to perform operations comprising:

receiving an input that selects an identifier associated with a deployment from within a dropdown menu presented within a graphical user interface (GUI), the deployment comprising a plurality of client devices;

assigning a metrics submission interval to the identifier associated with the deployment that comprises the plurality of client devices of the deployment in response to the input that selects the identifier associated with the deployment;

querying each of the plurality of client devices based on the metrics submission interval assigned to the identifier associated with the deployment;

receiving a metrics submission from a client device from among the plurality of client devices;

assigning the metrics submission received from the client device from among the plurality of client devices to a metrics category, the metrics category comprising a plurality of metrics submissions;

generating a score of the metrics category based on the plurality of metrics submissions that include the metrics submission received from the client device;

determining a visualization type based on at least the deployment; and causing display of a presentation of the score of the metrics category based on the visualization type.

9. The non-transitory machine-readable storage medium of claim 8, wherein the receiving the input that selects the identifier associated with the deployment includes:

causing display of a metrics collection interface, the metrics collection interface including a presentation of a list of deployment identifiers, the list of deployment identifiers including the identifier associated with the deployment; and receiving a selection of the deployment identifier from among the list of deployment identifiers.

10. The non-transitory machine-readable storage medium of claim 8, wherein
the metrics submission comprises at least a duration string that indicates a metrics type of the metrics submission.

11. The non-transitory machine-readable storage medium of claim 8, wherein the operations further comprise:

causing display of a visualization of the metrics submission based on a metrics type of the metrics submission.

12. The non-transitory machine-readable storage medium of claim 8, wherein the operations further comprise:

applying a scoring calculation to quantify each of the deployments, wherein the scoring calculation comprises of an algorithm that counts all instances of a software application running with a plurality of users;

assigning a point to each client device running the software application running with the plurality of users; and summing, using the algorithm, the points for the plurality of client devices to generate the score.

13. The non-transitory machine-readable storage medium of claim 10, wherein the metrics submission further comprises indications of one or more of:

a frequency of use of a software application executed by the client device;

a number of unique users of the software application at the client device; and a list of actions executed with the software application at the client device.

14. The non-transitory machine-readable storage medium of claim 10, wherein the metrics submission further comprises a feature identifier, a product identifier, and the identifier of the deployment, and the operations further comprise:
  receiving a request that includes an identification of one or more of the feature identifier, the product identifier, and the identifier of the deployment from the metrics submission; and
  generating a visualization of the metrics submission in response to the request.

15. A method comprising:
  receiving an input that selects an identifier associated with a deployment, the deployment comprising a plurality of client devices;
  receiving an input that selects an identifier associated with a deployment from within a dropdown menu presented within a graphical user interface (GUI), the deployment comprising a plurality of client devices;
  assigning a metrics submission interval to the identifier associated with the deployment that comprises the plurality of client devices of the deployment in response to the input that selects the identifier associated with the deployment;
  querying each of the plurality of client devices based on the metrics submission interval assigned to the identifier associated with the deployment;
  receiving a metrics submission from a client device from among the plurality of client devices;
  assigning the metrics submission received from the client device from among the plurality of client devices to a metrics category, the metrics category comprising a plurality of metrics submissions;
  generating a score of the metrics category based on the plurality of metrics submissions that include the metrics submission received from the client device;
  determining a visualization type based on at least the deployment; and
  causing display of a presentation of the score of the metrics category based on the visualization type.

16. The method of claim 15, wherein the receiving the input that selects the identifier associated with the deployment includes:
  causing display of a metrics collection interface, the metrics collection interface including a presentation of a list of deployment identifiers, the list of deployment identifiers including the identifier associated with the deployment; and
  receiving a selection of the deployment identifier from among the list of deployment identifiers.

17. The method of claim 15, wherein the metrics submission comprises at least a duration string that indicates a metrics type of the metrics submission.

18. The method of claim 15, wherein the method further comprises:
  causing display of a visualization of the metrics submission based on a metrics type.

19. The method of claim 15, wherein the generating the score of the metric category further comprises:
  applying a scoring calculation to quantify each of the deployments, wherein the scoring calculation comprises of an algorithm that counts all instances of a software application running with a plurality of users;
  assigning a point to each client device running the software application running with the plurality of users; and
  summing, using the algorithm, the points for the plurality of client devices to generate the score.

20. The method of claim 17, wherein the metrics submission further comprises indications of one or more of:
  a frequency of use of a software application executed by the client device;
  a number of unique users of the software application at the client device; and
  a list of actions executed with the software application at the client device.

* * * * *